United States Patent
Blair et al.

(10) Patent No.: US 11,573,070 B2
(45) Date of Patent: Feb. 7, 2023

(54) ELECTRICAL COLOR CHART TAPE MEASURE APPARATUS

(71) Applicants: Shawn Blair, Nashville, TN (US); Aaron Conway, Nashville, TN (US)

(72) Inventors: Shawn Blair, Nashville, TN (US); Aaron Conway, Nashville, TN (US)

(*) Notice: Subject to any disclaimer, the term of this patent is extended or adjusted under 35 U.S.C. 154(b) by 155 days.

(21) Appl. No.: 17/130,191

(22) Filed: Dec. 22, 2020

(65) Prior Publication Data
US 2022/0196376 A1 Jun. 23, 2022

(51) Int. Cl.
*G01B 3/1084* (2020.01)
*G01B 3/1071* (2020.01)
*G01J 3/52* (2006.01)

(52) U.S. Cl.
CPC ........ *G01B 3/1084* (2013.01); *G01B 3/1071* (2013.01); *G01J 3/52* (2013.01)

(58) Field of Classification Search
CPC ........ G01B 3/1084; G01B 3/1071; G01J 3/52
See application file for complete search history.

(56) References Cited

U.S. PATENT DOCUMENTS

| | | | |
|---|---|---|---|
| 4,700,491 A | 10/1987 | Rhea, Jr. | |
| 4,811,489 A * | 3/1989 | Walker | G01B 3/004 33/476 |
| 5,884,408 A * | 3/1999 | Simmons | G01B 3/004 33/761 |
| 6,962,002 B2 * | 11/2005 | Panosian | G01B 3/1084 33/760 |
| 7,200,951 B2 | 4/2007 | O'Connor | |
| 7,631,439 B2 * | 12/2009 | Black | G01B 3/1003 33/759 |
| 8,789,286 B1 * | 7/2014 | Vieczorek, Jr. | G01B 3/1003 33/760 |
| 2004/0035012 A1 | 2/2004 | Mochnke | |
| 2009/0265951 A1 * | 10/2009 | Black | G01B 3/1003 33/759 |
| 2010/0139110 A1 * | 6/2010 | Germain | G01B 3/1084 33/755 |
| 2019/0162514 A1 * | 5/2019 | LeMieux | B25H 7/04 |

FOREIGN PATENT DOCUMENTS

WO WO9811402 3/1998

* cited by examiner

*Primary Examiner* — Yaritza Guadalupe-McCall

(57) ABSTRACT

An electrical color chart tape measure apparatus for viewing a color code chart while measuring conduit includes a tape having a housing front side with a blade aperture extending therethrough adjacent the housing bottom side. A tape blade is coupled within the tape housing and is slidably extendable and retractable through the blade aperture. The tape blade has a blade top side with a plurality of hash markings and a plurality of corresponding numerical inch measurement markings. A claw is coupled to a distal end of the tape blade. A plurality of color indicators is coupled to the tape blade between the plurality of numerical inch measurement markings. A color chart is coupled to the tape housing and has a low voltage color key and a high voltage color key corresponding with the plurality of color indicators.

7 Claims, 3 Drawing Sheets

ELECTRICAL COLOR CHART TAPE MEASURE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tape measure devices and more particularly pertains to a new tape measure device for viewing a color code chart while measuring conduit.

(2) Description of Related Art Including Information Disclosed Under 37 CFR 1.97 and 1.98

The prior art relates to tape measure devices. Existing devices with color coding for electricians often utilize symbols and require use in conjunction with charts. Other devices integrate the color coding with elements of the tape measure, making the measuring function more difficult to use. Known devices fail to demonstrate an easy color coded chart reminder for both low voltage and high voltage wire coloring while remaining easy to use for the primary function of measurement.

BRIEF SUMMARY OF THE INVENTION

An embodiment of the disclosure meets the needs presented above by generally comprising a tape housing having a housing front side, a housing back side, a housing top side, a housing bottom side, a housing left side, and a housing right side. The housing front side has a blade aperture extending therethrough adjacent the housing bottom side. A tape blade is coupled within the tape housing. The tape blade is slidably extendable and retractable through the blade aperture. The tape blade has a blade top side with a plurality of hash markings and a plurality of corresponding numerical inch measurement markings. A claw is coupled to a distal end of the tape blade. A plurality of color indicators is coupled to the tape blade. The plurality of color indicators is coupled between the plurality of numerical inch measurement markings. A color chart is coupled to the tape housing. The color chart is coupled to the housing right side and has a low voltage color key and a high voltage color key corresponding with the plurality of color indicators.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
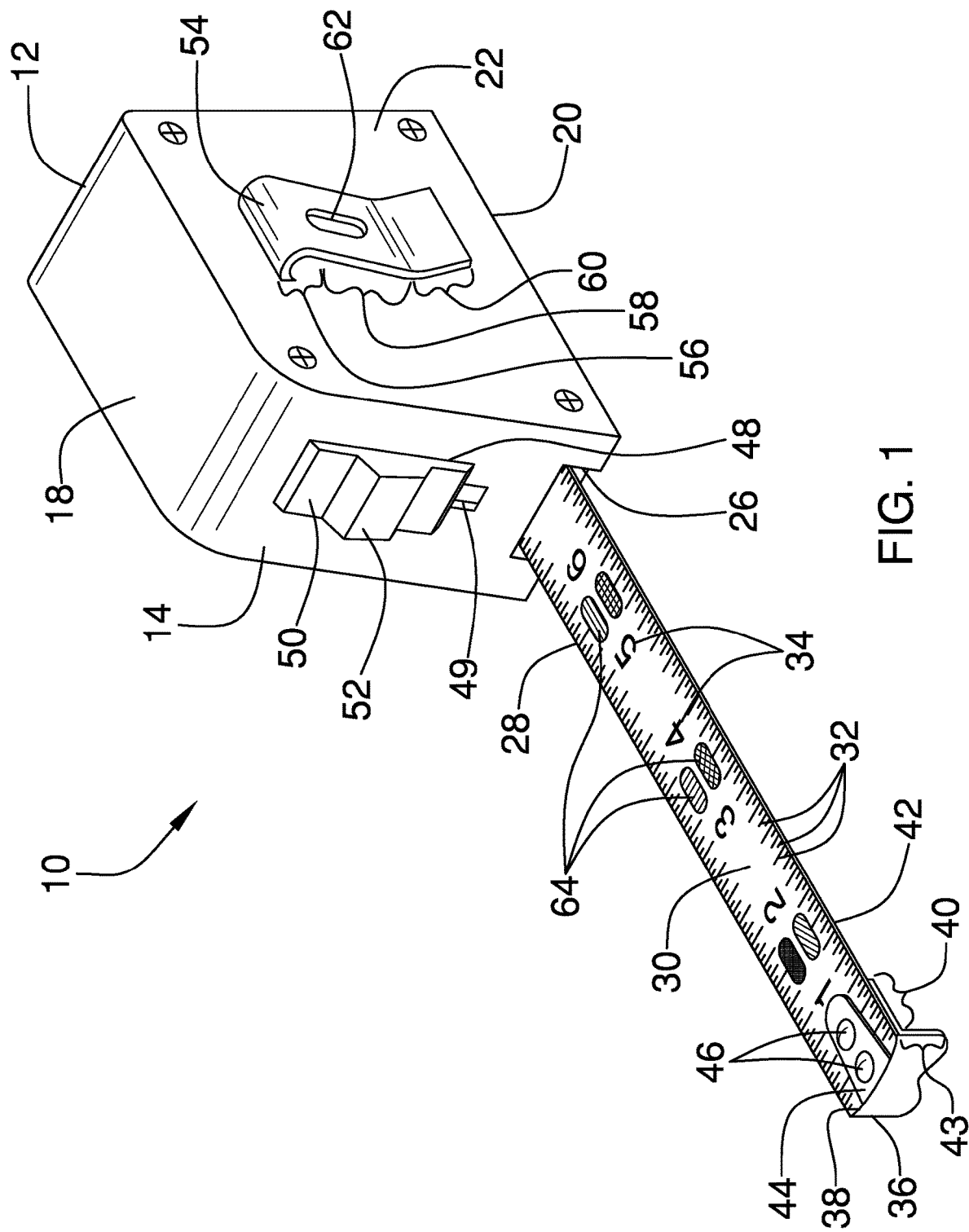
FIG. 1 is an isometric view of an electrical color chart tape measure apparatus according to an embodiment of the disclosure.

With reference now to the drawings, and in particular to FIGS. 1 through 4 thereof, a new tape measure device embodying the principles and concepts of an embodiment of the disclosure and generally designated by the reference numeral 10 will be described.

Figure 2:
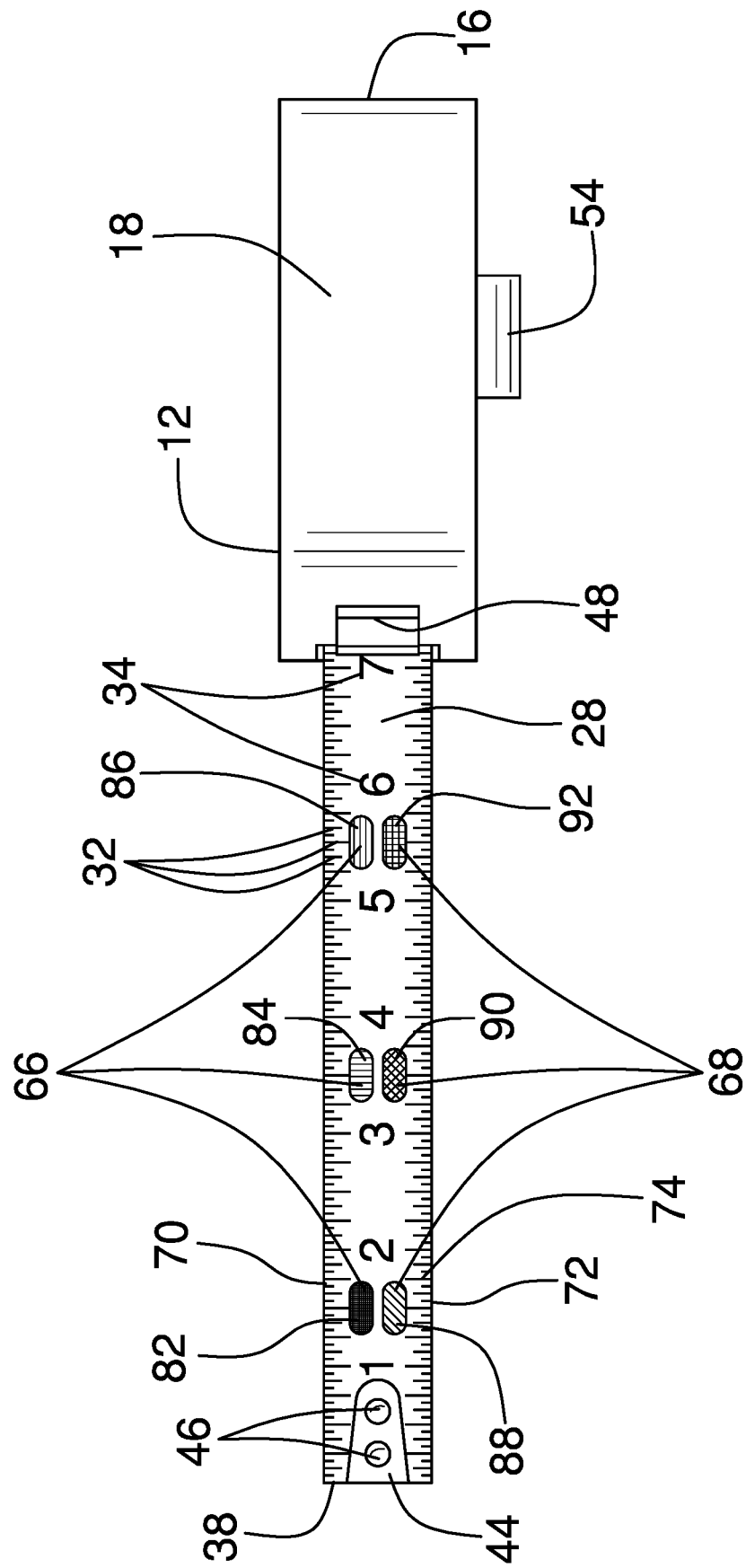
FIG. 2 is a top plan view of an embodiment of the disclosure.
Figure 3:
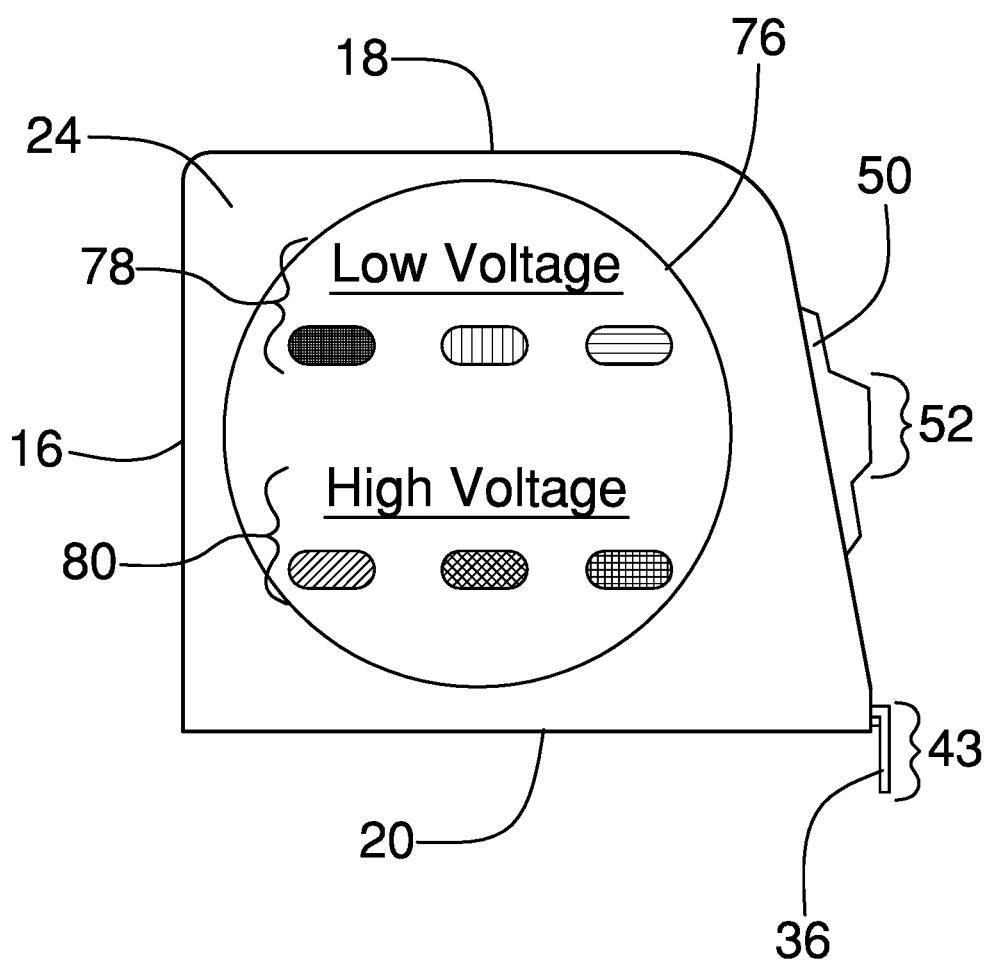
FIG. 3 is a side elevation view of an embodiment of the disclosure.

As best illustrated in FIGS. 1 through 3, the electrical color chart tape measure apparatus 10 generally comprises a tape housing 12 having a housing front side 14, a housing back side 16, a housing top side 18, a housing bottom side 20, a housing left side 22, and a housing right side 24. The housing front side 14 has a blade aperture 26 extending therethrough adjacent the housing bottom side 20. A tape blade 28 is coupled within the tape housing 12. The tape blade 28 is slidably extendable and retractable through the blade aperture 26 and may be springingly wound within the tape housing 12 to maximize length and to allow for automatic retraction. The tape blade 28 has a blade top side 30 with a plurality of hash markings 32 and a plurality of corresponding numerical inch measurement markings 34.

A claw 36 is coupled to the tape blade 28. The claw 36 is coupled to a distal end 38 of the tape blade and may have a support portion 40 adjacent a blade bottom side 42 and a catch portion 43 extending perpendicularly away from the blade bottom side 42. An attachment portion 44 may extend along the blade top side 30 and has a pair of attachment pins 46 extending through to the support portion 40. The claw 36 may allow the pair of attachment pins 46 a range of motion to compensate for the width of the catch portion 43 if it is hooked onto an edge or pushed against a wall.

A thumb lock 48 may be coupled to the tape housing 12. The thumb lock 48 extends through a lock slot 49 of the housing front side to selectively prevent and allow the tape blade 28 from extending or retracting through the blade aperture 26. The thumb lock 48 may have a slider portion 50 and a faceted extension portion 52 for easy grip while being pushed towards either the housing bottom side 20 or the housing top side 18. The housing front side 14 may form an acute angle with the housing bottom side 20 to allow for more ergonomic actuation of the thumb lock 48. A belt clip 54 may be coupled to the tape housing 12. The belt clip 54 may have a curved portion 56 extending from the housing left side 22 of the tape housing, a straight return portion 58 leading back to the tape housing 12, and a lip portion 60 angled away from the tape housing 12. The return portion 58 may have a clip aperture 62 extending therethrough. The belt clip 54 is elastically flexible to allow a user to attach the apparatus 10 to his or her belt or an article of clothing.

A plurality of color indicators 64 is coupled to the tape blade 28 between the plurality of numerical inch measurement markings 34. The plurality of color indicators 64 may comprise a plurality of low voltage color indicators 66 and a plurality of high voltage color indicators 68. The plurality of color indicators 64 has one low voltage color indicator 66 and one high voltage color indicator 68 between each pair of adjacent numerical inch measurement markings 34. The plurality of low voltage color indicators 66 may be disposed between the midline and a right blade edge 70 of the tape blade and the plurality of high voltage color indicators 68 may be disposed between the midline and a left blade edge 72 of the tape blade. The plurality of color indicators 64 does not interfere with the plurality of hash markings 32 to allow for measurements to still be clearly read. A plurality of half-inch markings 74 of the plurality of hash markings may contact the plurality of color indicators 64. Each of the plurality of color indicators 64 may be obround.

A color chart 76 is coupled to the tape housing 12. The color chart 76 is coupled to the housing right side 24 and has a low voltage color key 78 and a high voltage color key 80 corresponding with the plurality of color indicators 64.

In use, the color chart 76 and the plurality of color indicators 64 corresponds with a standardized system of wire coloring to show the user which color wire to use during installations while simultaneously allowing him or her to measure conduit with the tape blade 28. In one embodiment, the plurality of low voltage color indicators 66 may be a black indicator 82 between multiples of 1 and 2, a red indicator 84 between multiples of 3 and 4, and a blue indicator 86 between multiples of 5 and 6, while the plurality of high voltage color indicators 68 may be a brown indicator 88 between multiples of 1 and 2, an orange indicator 90 between multiples of 3 and 4, and a yellow indicator 92 between multiples of 5 and 6.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An electrical color chart tape measure apparatus comprising:
   a tape housing, the tape housing having a housing front side, a housing back side, a housing top side, a housing bottom side, a housing left side, and a housing right side, the housing front side having a blade aperture extending therethrough adjacent the housing bottom side;
   a tape blade coupled within the tape housing, the tape blade being slidably extendable and retractable through the blade aperture, the tape blade having a blade top side with a plurality of hash markings and a plurality of corresponding numerical inch measurement markings;
   a claw coupled to the tape blade, the claw being coupled to a distal end of the tape blade;
   a plurality of color indicators coupled to the tape blade, the plurality of color indicators being coupled between the plurality of numerical inch measurement markings, the plurality of color indicators comprising a plurality of low voltage color indicators and a plurality of high voltage color indicators, the plurality of color indicators having one low voltage color indicator and one high voltage color indicator between each pair of adjacent numerical inch measurement markings, the low voltage color indicator and the high voltage color indicator between each pair of adjacent numerical inch measurement markings being spaced apart from each other and from a central longitudinal axis of said tape blade passing between the low voltage color indicator and the high voltage color indicator, each of the plurality of color indicators being obround and symmetrical about a midline of the color indicator; and
   a color chart coupled to the tape housing, the color chart being coupled to the housing right side and having a low voltage color key and a high voltage color key corresponding with the plurality of color indicators.

2. The electrical color chart tape measure apparatus of claim 1 further comprising the plurality of low voltage color indicators being disposed between the central longitudinal axis of the tape blade and a right blade edge of the tape blade and the plurality of high voltage color indicators being disposed between the central longitudinal axis of the tape blade and a left blade edge of the tape blade.

3. The electrical color chart tape measure apparatus of claim 1 further comprising the plurality of color indicators not interfering with the plurality of hash markings, each of a plurality of half-inch markings of the plurality of hash markings contacting a respective one of the plurality of color indicators such that each half-inch marking extends perpendicularly from the respective one of the plurality of color indicators in alignment with the midline of the respective one of the color indicators.

4. The electrical color chart tape measure apparatus of claim 1 further comprising a thumb lock coupled to the tape housing, the thumb lock extending through a lock slot of the housing front side to selectively prevent and allow the tape blade from extending or retracting through the blade aperture.

5. The electrical color chart tape measure apparatus of claim 1 further comprising a belt clip coupled to the tape housing, the belt clip being coupled to the housing left side.

6. The electrical color chart tape measure apparatus of claim 5 further comprising the belt clip having a curved portion extending from the tape housing, a straight return portion leading back to the tape housing, and a lip portion angled away from the tape housing, the return portion having a clip aperture extending therethrough.

7. An electrical color chart tape measure apparatus comprising:
- a tape housing, the tape housing having a housing front side, a housing back side, a housing top side, a housing bottom side, a housing left side, and a housing right side, the housing front side having a blade aperture extending therethrough adjacent the housing bottom side;
- a tape blade coupled within the tape housing, the tape blade being slidably extendable and retractable through the blade aperture, the tape blade having a blade top side with a plurality of hash markings and a plurality of corresponding numerical inch measurement markings;
- a claw coupled to the tape blade, the claw being coupled to a distal end of the tape blade;
- a thumb lock coupled to the tape housing, the thumb lock extending through a lock slot of the housing front side to selectively prevent and allow the tape blade from extending or retracting through the blade aperture;
- a belt clip coupled to the tape housing, the belt clip being coupled to the housing left side, the belt clip having a curved portion extending from the tape housing, a straight return portion leading back to the tape housing, and a lip portion angled away from the tape housing, the return portion having a clip aperture extending therethrough;
- a plurality of color indicators coupled to the tape blade, each of the plurality of color indicators being obround and symmetrical about a midline of the color indicator, the plurality of color indicators being coupled between the plurality of numerical inch measurement markings, the plurality of color indicators comprising a plurality of low voltage color indicators and a plurality of high voltage color indicators, the plurality of color indicators having one low voltage color indicator and one high voltage color indicator between each pair of adjacent numerical inch measurement markings, the low voltage color indicator and the high voltage color indicator between each pair of adjacent numerical inch measurement markings being spaced apart from each other and from a central longitudinal axis of said tape blade passing between the low voltage color indicator and the high voltage color indicator, the plurality of low voltage color indicators being disposed between the central longitudinal axis of the tape blade and a right blade edge of the tape blade and the plurality of high voltage color indicators being disposed between the central longitudinal axis of the tape blade and a left blade edge of the tape blade, the plurality of color indicators not interfering with the plurality of hash markings, each of a plurality of half-inch markings of the plurality of hash markings contacting a respective one of the plurality of color indicators such that each half-inch marking extends perpendicularly from the respective one of the plurality of color indicators in alignment with the midline of the respective one of the color indicators; and
- a color chart coupled to the tape housing, the color chart being coupled to the housing right side and having a low voltage color key and a high voltage color key corresponding with the plurality of color indicators.

* * * * *